United States Patent [19]
Alford et al.

[11] Patent Number: 5,578,885
[45] Date of Patent: Nov. 26, 1996

[54] ROTOR ASSEMBLY FOR HYBRID ALTERNATOR

[75] Inventors: Stephen A. Alford, Alexandria; Richard A. Rausch, Anderson; Gilbert E. Shirk, Chesterfield, all of Ind.

[73] Assignee: General Motors Corporation, Detroit, Mich.

[21] Appl. No.: 361,419

[22] Filed: Dec. 22, 1994

[51] Int. Cl.$^6$ .............................. H02K 1/22; H02K 21/04
[52] U.S. Cl. .............................................. 310/263; 310/181
[58] Field of Search ...................................... 310/156, 181, 310/263

[56] References Cited

U.S. PATENT DOCUMENTS

| | | | |
|---|---|---|---|
| 3,230,404 | 1/1966 | Graham | 310/51 |
| 3,411,027 | 11/1968 | Rosenberg | 310/181 |
| 4,588,915 | 5/1986 | Gold et al. | 310/263 |
| 4,959,577 | 9/1990 | Radomski | 310/263 |
| 5,382,862 | 1/1995 | Ward et al. | 310/263 |
| 5,483,116 | 1/1996 | Kusase et al. | 310/263 |

*Primary Examiner*—Clayton E. LaBalle
*Attorney, Agent, or Firm*—Vincent A. Cichosz

[57] ABSTRACT

An alternator has a rotor with a plurality of permanent magnets disposed between opposing claw pole members and a field coil. The plurality of permanent magnets are secured to at least one ring-shaped carrier which surrounds the field coil and locates the magnets into appropriate positions between the fingers of the claw pole members.

5 Claims, 6 Drawing Sheets

ROTOR ASSEMBLY FOR HYBRID ALTERNATOR

BACKGROUND OF THE INVENTION

This invention relates to alternating current generators and more specifically to alternating current generators having magnetic claw-pole segments, permanent magnets interposed between adjacent pole fingers and a flux controlling field coil. Such alternating current generators are hereinafter referred to as hybrid generators.

Examples of such hybrid generators are found in U.S. Pat. No. 4,959,577 to Radomski and assigned to the assignee of the present invention. A conventional stator comprising a multi-phase output winding and magnetic material laminations is supported by a housing. Further, the hybrid generators utilize a Lundell rotor that is comprised of two claw-pole members having interleaved pole fingers and a field coil surrounding a magnetic core therebetween the claw-pole members. The claw-pole members, magnetic core and field coil are supported by a rotor shaft and are secured thereto. Opposite ends of the shaft are supported by bearings and the assembly is free to rotate within the stator with minimal clearance between the rotor and stator. Slip rings are secured to the shaft and in operation couple the field coil to a current source via contact brushes. A plurality of permanent magnets are disposed between adjacent claw-pole fingers. When the field coil is not energized, the magnetic flux developed by the permanent magnets is shunted through the rotor assembly. However, when the field coil is energized, the magnetic flux developed by the permanent magnets additively contributes to flux across the stator/rotor air gap resulting from field coil excitation.

The permanent magnets are fitted into grooves or slots formed along the opposing side surfaces of adjacent claw-pole fingers. Further, a suitable adhesive may be used to secure the permanent magnets to the claw-pole fingers. Such an assembly requires significant machining of the claw-pole members and strict dimensional control to assure appropriate magnet retention without undue stress to the permanent magnets which tend to be brittle. The use of adhesives as retention means for the magnets disadvantageously requires fixturing of individual magnets, allowances for curing time and is cumbersome in a mass production environment. Furthermore, the adhesives must be able to withstand the swings in thermal loading typically experienced in alternating current generators. A dozen individual permanent magnets are required in a typical six finger claw-pole rotor. Since individual handling of the permanent magnets is required the assembly process is even more cumbersome, expensive and subject to variations in build quality.

SUMMARY OF THE INVENTION

Accordingly, in a hybrid generator, a rotor assembly according to the invention includes a shaft to which is secured first and second claw-pole segments. Each claw-pole segment has a plurality of pole fingers that interleave with those of the other claw-pole segment. Each pair of adjacent opposing pole fingers has a space therebetween into which is disposed a respective permanent magnet. Each permanent magnet is secured circumferentially by side surfaces of the adjacent opposing pole fingers and radially outwardly by support ledges extending from each pole finger, which sides and support ledges cooperate to form a permanent magnet channel. A rotor core formed of magnetic material is also secured to the shaft and is located between the pair of claw-pole members. A field coil is secured about the core. The permanent magnets are secured at the outer periphery of a ring-shaped carrier, itself is sized for installation about the field coil, to define a magnet assembly. The permanent magnets are secured to the ring-shaped member in complementary orientation with the channels defined between the opposing pole fingers of the pair of claw-pole members.

In accordance with one embodiment of the invention, the claw-pole members have generally V-shaped pole fingers resulting in adjacent channels that are skewed in opposite diagonal directions. The permanent magnet assembly includes a unitary substantially ring-shaped carrier supporting a plurality of permanent magnets at its outer periphery. The permanent magnets are complementarily oriented with the skewed permanent magnet channels.

In accordance with another embodiment of the invention again having substantially V-shaped pole fingers and skewed channels, the magnet assembly comprises a pair of substantially ring-shaped members, each of which supports one-half of the permanent magnets. One of the carriers supports all of the magnets in one of the two opposite diagonal directions and the other of the carriers supports all of the other magnets in the other of the two opposite diagonal directions. The individual assemblies may thereby be manufactured using conventional overmold technology to capture the magnets and secure them to the carrier in the desired orientation. The two magnet assemblies are stacked axially, interleaving respective magnets in appropriate complementary orientation with the skewed permanent magnet channels.

Flats surfaces may advantageously be provided on the outer peripheral surface of each of the two carriers between respective adjacent permanent magnets. The flat surfaces on one of the two carriers thereby cooperate with the respective backs surfaces of the permanent magnets secured to the other of the two carriers to thereby prevent relative rotation therebetween.

In a rotor assembly wherein the claw pole members have pole fingers that are substantially axial resulting in adjacent channels that are likewise substantially axial, the permanent magnet assembly may also include a unitary substantially ring-shaped carrier supporting a plurality of permanent magnets at its outer periphery. The permanent magnets are complementarily oriented with the axial permanent magnet channels. Such a geometry allows for a single carrier assembly to be manufactured using conventional overmold technology. Additionally, the geometry is well suited to applying known powder forming processes in manufacturing a unitary carrier and magnet structure.

These and other features will become more apparent after reading the detailed description and studying the accompanying referenced drawings.

DETAILED DESCRIPTION OF THE INVENTION

Details of operation and of much of the surrounding structure of an alternating current generator to which the utility of the rotor assembly as herein described are generally well known to those skilled in the art and, therefore, the discussion herein is limited to only those features of the present invention necessary for an understanding thereof. The aforementioned U.S. Pat. No. 4,959,577 to Radomski, however, provides exemplary additional details as may be of general applicability.

Figure 1:
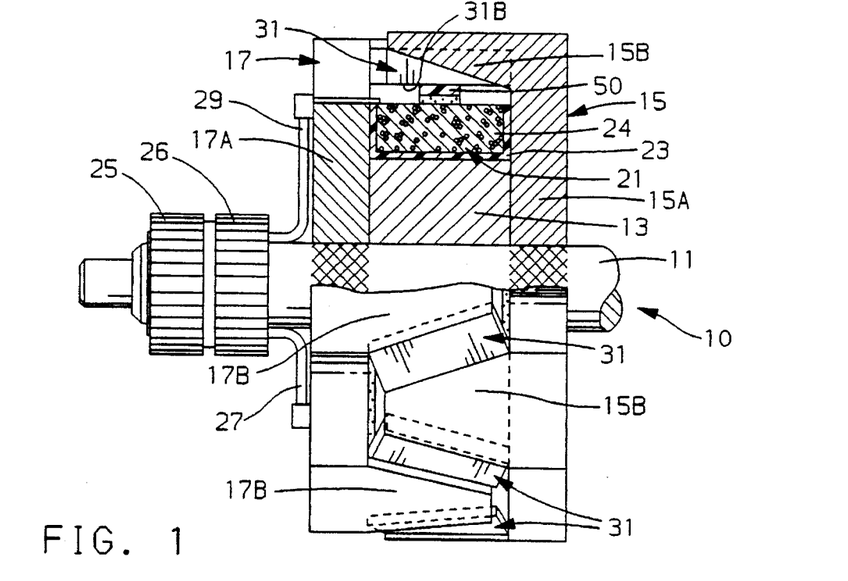
FIG. 1 illustrates a portion of a hybrid alternator in accordance with the present invention showing generally the structure thereof.

Referring now to the drawings wherein like characters represent the same or corresponding parts throughout the several views, one representative form of a rotor assembly for application in a hybrid generator and embodying the concepts of the present invention is designated by the numeral 10 in FIG. 1. The rotor is comprised of a shaft 11 that is supported for rotation by bearings (not shown) and coupled to a prime mover such as a motor vehicle engine via a pulley system and an accessory drive belt (also not shown). Rotor 10 further comprises claw pole members 15 and 17 which are secured to shaft 11 to rotate therewith. A core 13 is also secured to shaft 11 intermediate claw-pole members 15 and 17. Claw-pole members 15,17, core 13 and shaft 10 are a magnetic material such as steel. In the drawing, core 13 is illustrated as an individual component piece, however, it is to be understood that the core of rotor 10 may be an integral axial extension of one or both claw-pole members.

About core 13 is field coil assembly 21 which is comprised of an insulative spool 23 and field coil 24. Alternatives to this established core and spool design are known, including one alternative for achieving improved heat conduction from the coil windings to the core as disclosed in U.S. Pat. No. 4,588,915 to Gold et al., also assigned to the assignee of the present invention. The ends of field coil 24 are coupled to respective slip rings 25 and 26, typically copper, via conductors 29 and 27 respectively. Slip rings 25,26 and conductors 29,27 likewise are secured to rotate with shaft 11, the flux generating direct current being delivered to the field coil 24 by a pair of brushes (not shown) contacting the slip rings.

Each claw-pole member 15,17 is identical to the other, having respective hub sections 15A,17A and a plurality of respective pole fingers 15B,17B. The pole fingers extend axially from the hub sections bracketing the field coil assembly 21 and core 13 radially inwardly therefrom. The pole fingers of each claw-pole member further are symmetrically spaced around the perimeter of the hub section and as assembled onto the shaft 11 interleave in a non-contacting spaced relationship with the pole fingers of the other claw-pole member.

Generally, the space therebetween a pair of adjacent interleaved pole fingers houses a permanent magnet, each of which is labeled 31. Permanent magnets 31 are generally rectangularly shaped with substantially flat faces. Each permanent magnet 31 has a pair of opposing pole faces 31N and 31S corresponding to north and south magnetic polarities respectively. These pole faces engage respective side surfaces on pole fingers 15B and 17B. All pole fingers 15B have respective side surfaces 14A,14B engaged with similar pole surfaces, 31N in the illustration. Likewise, pole fingers 17B have respective side surfaces 16A,16B engaged with the other similar pole surfaces, 31S in the illustration. Therefore, all pole fingers 15B have a north magnetic polarity and all pole fingers 17B have south magnetic polarity. The front faces 31F of the permanent magnets 31 are radially outward toward the stator and the back faces 31B of the permanent magnets 31 are radially inward toward the field coil assembly 21. The two end faces 31E are at opposite axial ends of each magnet 31.

Figure 2:
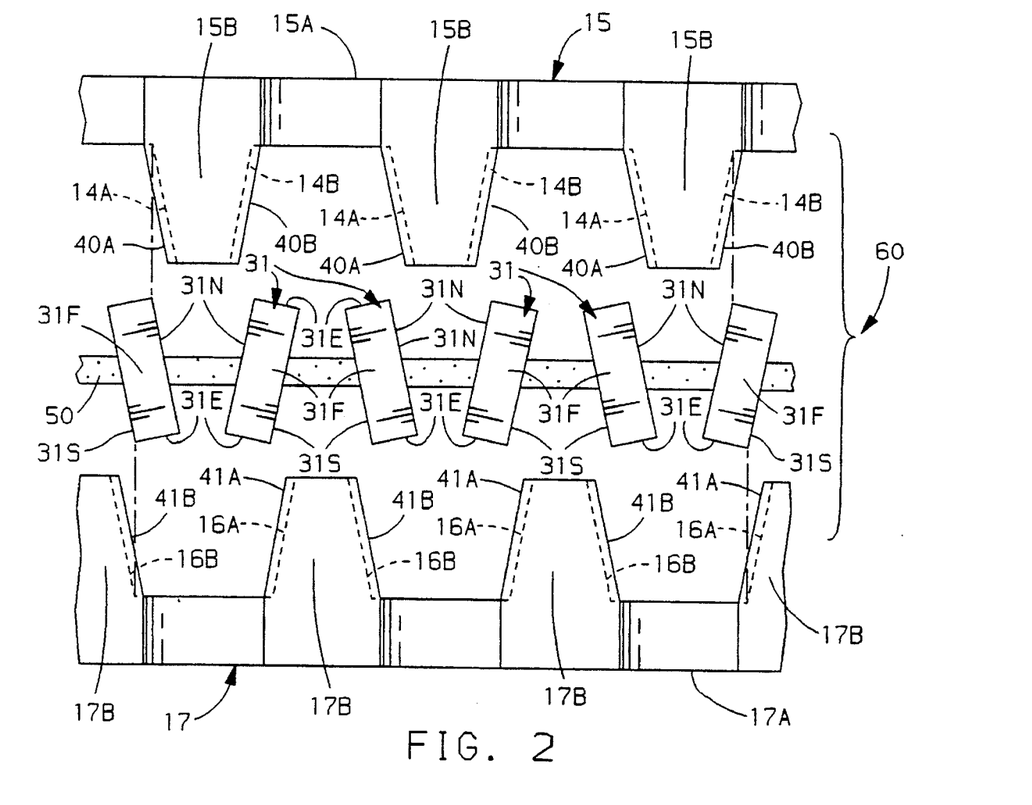
FIG. 2 illustrates a disassembled view of claw-pole members and magnet assembly in accordance with a first claw-pole member geometry with the curvature of illustrated features omitted for clarity.
Figure 12:
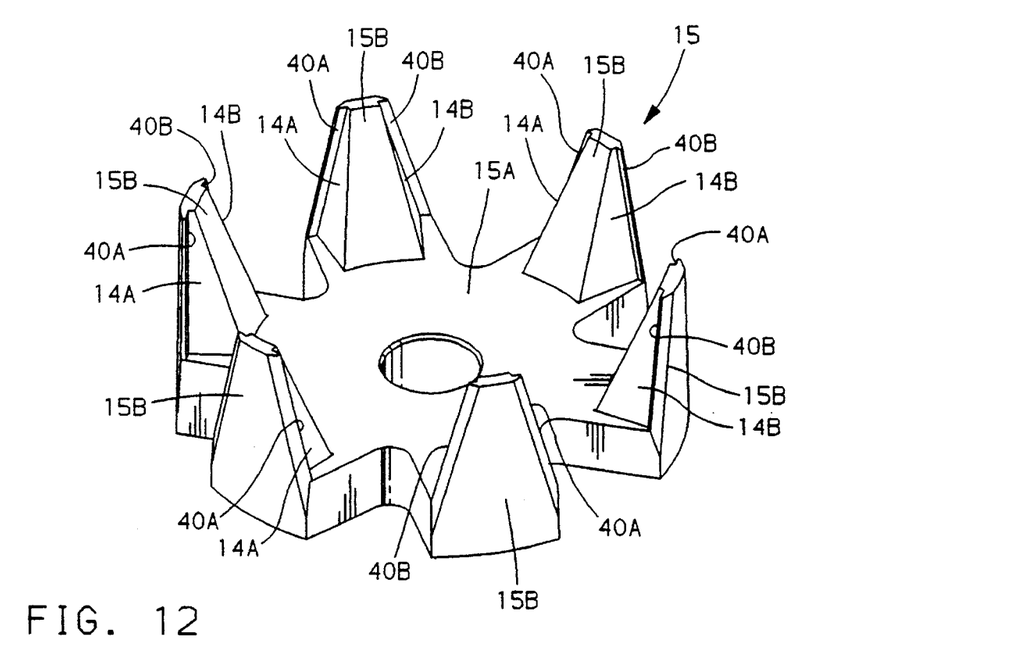
FIG. 12 is a perspective illustration of a claw-pole member in accordance with the first geometry as illustrated in FIG. 2.

With further reference to FIG. 12, a preferred geometry for a claw pole member is illustrated in a perspective view for clarity. Additionally, FIG. 2 provides a disassembled view of the two claw-pole members and permanent magnet assembly wherein the curvature of those features is omitted for clarity and the illustration therefore represents those features as appearing as if the structures were straightened out across the page. The number of pole fingers on each claw-pole member equals six, and each pole finger is generally V-shaped. That is to say, each pole finger is wider at the proximal end at the hub sections 15A,17A and tapered narrower at the distal end extending away from the respective hub section. The labels used in FIG. 12 to identify features, correspond to the one of the claw-pole members labeled 15 in the figures though it is understood that both claw-pole members are essentially identical and cooperate as illustrated in FIGS. 1 and 2. Each pole finger 15B and 17B has a pair of respective side surfaces 14A,14B and 16A,16B and a corresponding pair of support ledges 40A,40B and 41A,41B which are substantially normal to the respective side surfaces. Claw-pole members of such geometry may be produced either by forming out of heavy gauge steel by compression molding with heavy piercing and forming equipment as is well known in the art or produced by forming out of compressed iron particles as taught, for example, in U.S. patent application Ser. No. 08/157,452 assigned to the assignee of the present invention. The spaces between the interleaved pole fingers 15B and 17B define permanent magnet positions bounded by opposing respective side surfaces 14A,16B and 14B,16A. Furthermore, respective support ledges 40A,41B and 40B,41A further define these positions. The combination of the opposing side surfaces and corresponding support ledges provides a channel for the permanent magnets having radial and circumferential boundaries for containment of the magnets 31. Each channel is skewed on a diagonal with respect to axial alignment due to the characteristic V-shape of the claw-pole members; adjacent channels skewed in opposite diagonal directions and alternating channels being skewed in the same diagonal direction.

A substantially ring-shaped carrier 50 surrounds the field coil assembly 21. Permanent magnets 31 are coupled to carrier 50 about the outside perimeter thereof by appropriate fastening means, for example adhesives. The permanent magnets 31 are complementarily oriented and circumferentially spaced with respect to the permanent magnet channels so as to nest therein. Therefore, each magnet is skewed on a diagonal. Adjacent magnets are skewed in opposite diagonal directions and alternating magnets are skewed in the same diagonal direction. Carrier 50 is preferably made from an appropriate plastic such as "ULTEM 2100" commercially available from General Electric. It can therefore be appreciated that in assembly of the rotor 10, assuming generally that claw-pole member 15 is first assembled to shaft 11 followed by core 13 and coil assembly 21, magnet assembly 60 is placed around the field coil assembly 21 and locates all of the plurality of permanent magnets 31 against respective side surfaces 14A,14B and support ledges 40A,40B of pole fingers 15. Thereafter, claw-pole member 17 is assembled to shaft 11, the side surfaces 16A,16B and support ledges 41A,41B contacting the pre-located permanent magnets 31 in the same fashion as side surfaces and support ledges of fingers 15B.

Figure 3:
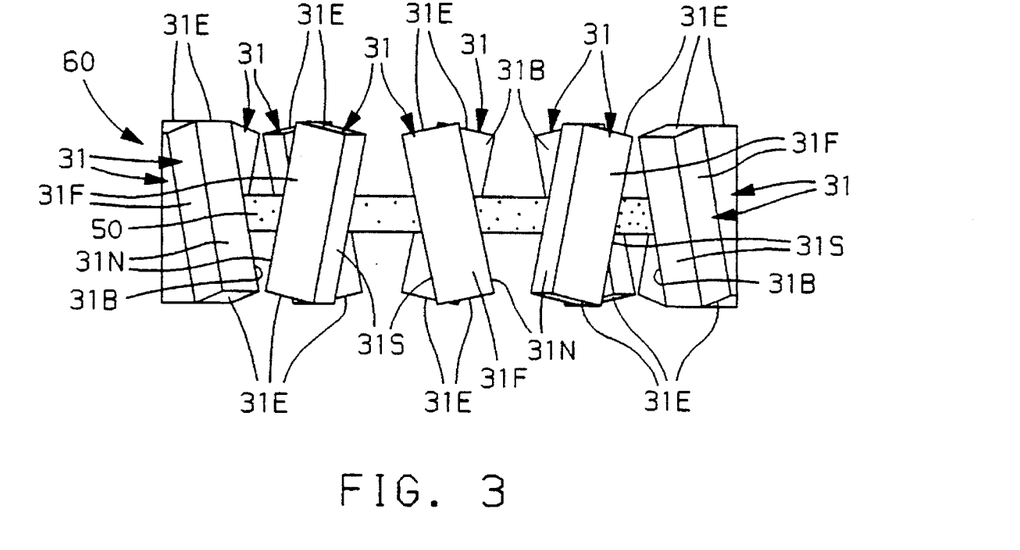
FIG. 3 illustrates a permanent magnet assembly in accordance with the present invention.
Figure 4:
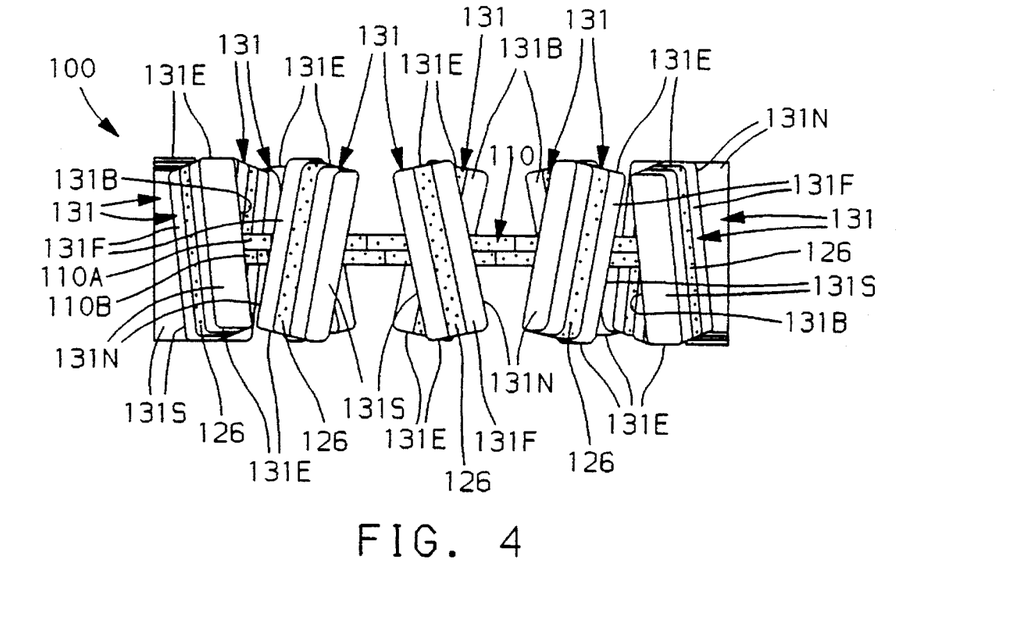
FIGS. 4–8 show various views of a permanent magnet assembly and portions thereof for use with the first claw-pole geometry illustrated in FIG. 2.

Referring now to FIG. 3, magnet assembly 60 is illustrated apart from other components of the rotor 10. Carrier 50 again preferably is comprised of a suitable material to which the permanent magnets are secured in appropriate orientation. Pole faces 31N,31S, back and front faces 31B, 31F and end faces 31E are all illustrated and labeled. With the symmetry of permanent magnet placement about the perimeter of carrier 50 and, in the instant embodiment having generally V-shaped pole fingers, it can be appreciated that assembly of the magnet assembly 60 to the claw-pole member is essentially fool proof. Handling of individual magnets is not required nor is the use of any fixture or adhesives. Such an assembly, however, has some short comings in manufacture and, while a viable design option, is not the preferred design. Some of the short comings will become apparent in the description below of a preferred magnet assembly design.

FIGS. 4–8 illustrate with various views a preferred design of a magnet assembly 100 consistent with the concepts and advantages of the present invention. It is assumed that the claw-pole members are similar in as much as they are generally V-shaped and cooperate to define channels via side surfaces and support ledges. The carrier 110 in this embodiment, however, comprises two substantially ring-shaped carriers 110A,110B, each supporting one half of the total number of permanent magnets. The two carrier design is preferred for reasons of improved manufacturability as will become apparent in the following description. The basic orientation and circumferential placement of permanent magnets 131 in magnet assembly 100 are seen to be the same as well they should be given that the assembly is providing for permanent magnet placement corresponding to like V-shaped claw-pole members. The permanent magnets are seen to have corresponding faces: pole faces 131N,131S; front and back faces 131F,131B; and, end faces 131E. However, each permanent magnet has a modified shape for improved fastening to a respective substantially ring-shaped carrier.

Figure 5:
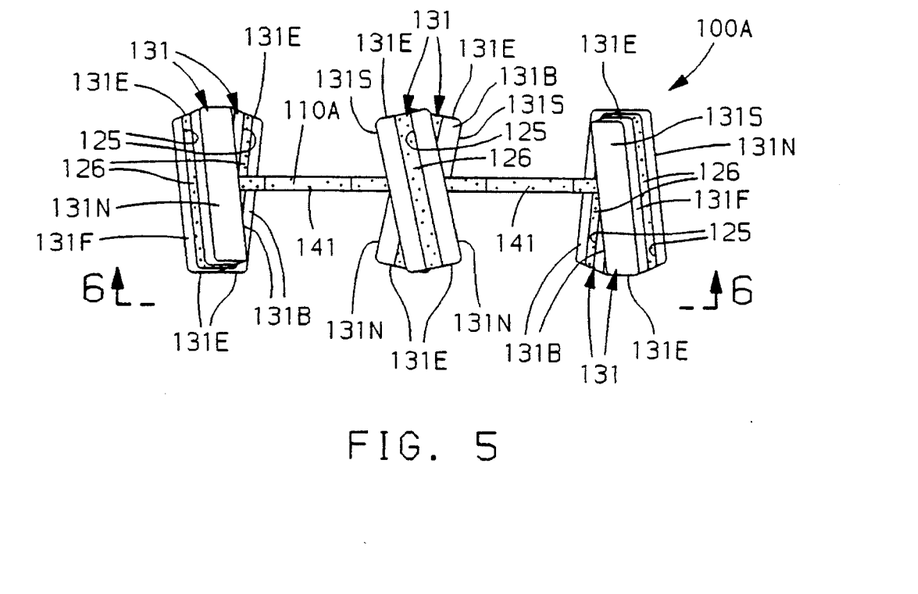
Figure 6:
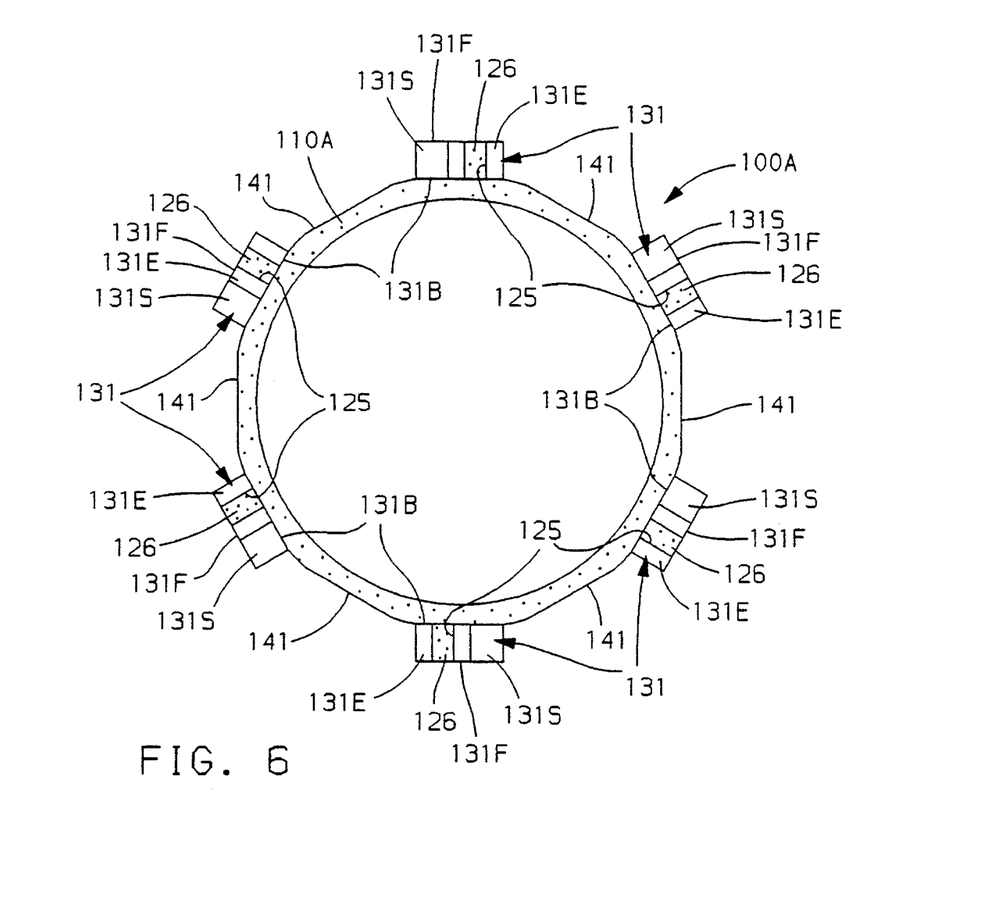
Figure 7:
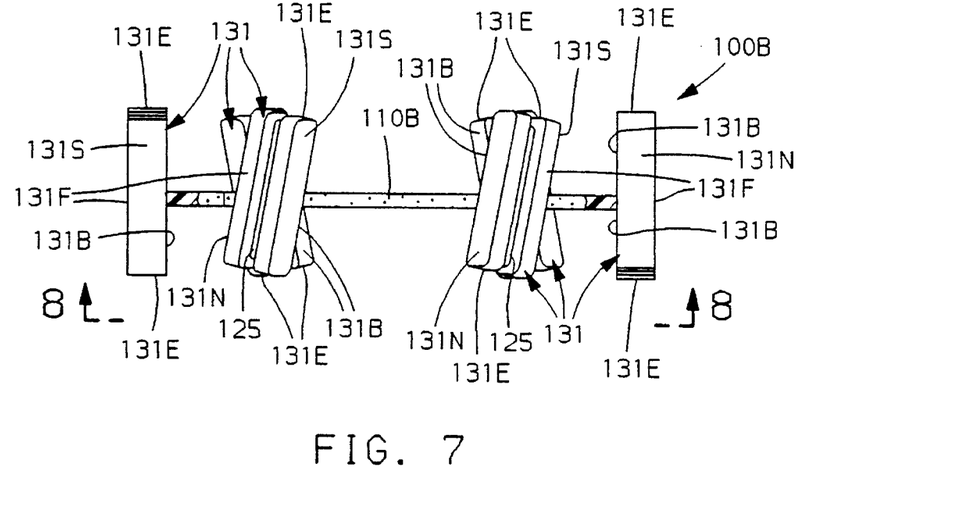
Figure 8:
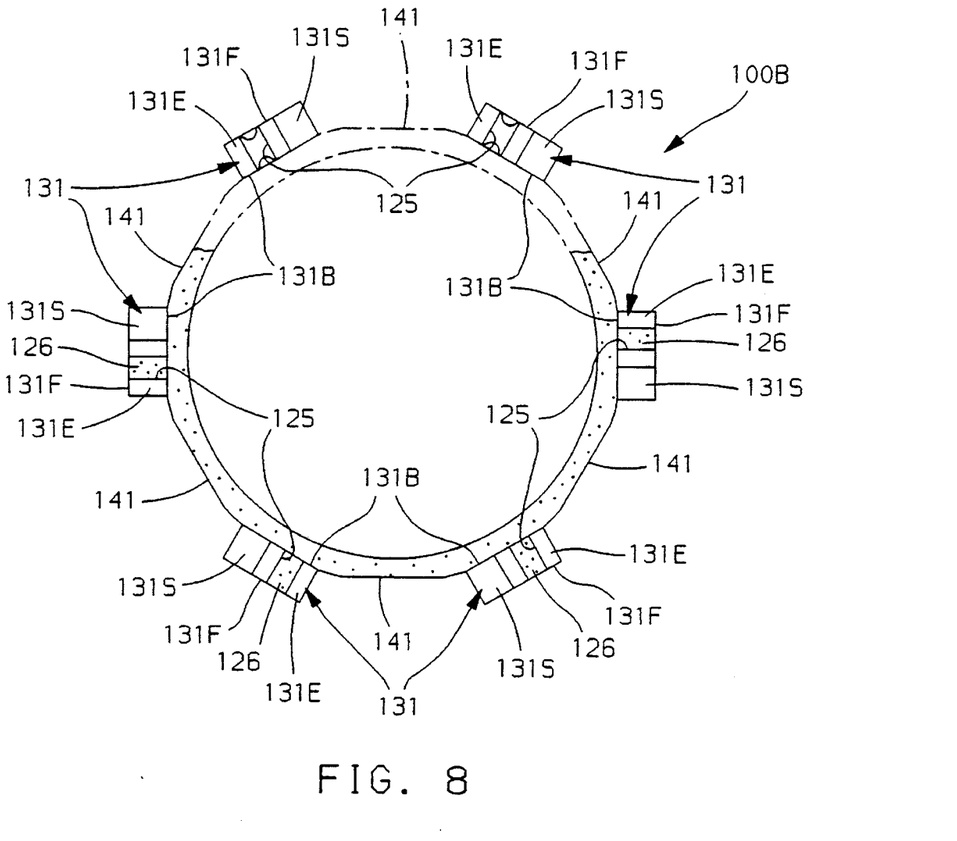

Referring to FIGS. 5 and 6, a first magnet assembly 100A comprised of a first substantially ring-shaped carrier 110A and a plurality of first permanent magnets 131 is illustrated. The plurality of first permanent magnets 131 are disposed in spaced relationship about the perimeter of carrier 110A. These permanent magnets correspond to a plurality of first alternating channel positions created by the cooperation of the two claw-pole members. As such, all of the magnets secured to carrier 110A are skewed in a first diagonal direction. Similarly with reference to FIGS. 7 and 8, a plurality of second permanent magnets 131 are disposed about the perimeter of a second substantially ring-shaped carrier 110B and comprise a second magnet assembly 100B. These permanent magnets likewise correspond to alternating channel positions, however, this time to a plurality of second alternating channel positions. Each one of the plurality of second permanent magnets is skewed in a second diagonal direction which is opposite the first diagonal direction. The first and second substantially ring-shaped carriers are shown stacked axially in FIG. 4 in the manner as they would be found assembled about the field coil assembly including appropriate circumferential spacing of the adjacent permanent magnets. Of course, it is apparent that the first and second carrier members may be assembled individually in sequence about the field coil assembly or sub-assembled and placed about the field coil assembly in a single step.

With respect to the first magnet assembly 100A, and particularly with respect to securing the plurality of first permanent magnets 131 to the first carrier member 110A, a preferred design provides for continuous slots 125 formed around the end faces 131E and front and back faces 131F, 131B of the permanent magnets 131. Each slot 125 provides a void for a band 126 of plastic therein, which band 126 is integral with the first carrier member 110A thereby cooperatively trapping and securing the permanent magnet. The plurality of first permanent magnets 131 are insert molded to the first carrier member 110A using well known overmolding techniques. The slots 125 in the permanent magnets 131 provide voids for material flow around the magnet, the band 126 formed therein being integral with the first carrier member 110A. While the immediately prior description has been provided with respect to the plurality of first permanent magnets and first carrier member 110A, it is to be understood that the description applies to the second magnet assembly 100B comprised of a plurality of second permanent magnets 131 and second carrier member 110B.

As previously indicated, a two carrier design is preferred for improved manufacturability of a magnet assembly. In the preferred overmold processing utilized to retain the permanent magnets in appropriate orientation, the skewing of adjacent magnets in opposite diagonal directions becomes problematic for simple insert mold designs particularly with respect to mold release. While it is possible to overcome the mold related obstacles associated with such geometries, a simpler mold design and release is possible with the geometries presented by permanent magnets skewed in the same diagonal direction. Additionally, a two carrier design advantageously provides for some relative movement therebetween the two sets of magnets such that normal tolerance variations and stack-ups in the carriers, magnets and claw pole members are taken up during assembly.

Another feature yet to be highlighted, and of significance in further simplifying the assembly of the rotor assembly in accordance with the present invention, is the plurality of flat surfaces 141 around the outer periphery of each carrier member 110A,110B between the magnets carried thereby. These flat surfaces 141 of one carrier cooperate with the back faces 131B of the permanent magnets 131 secured to the other carrier to thereby substantially restrict relative rotation of the magnet assemblies 100A,100B thereby placing the magnets into substantially the appropriate final assembly position. Some amount of relative rotation, however, is preferred such that normal variations and tolerance stack-ups are not fatal to the final assembly as mentioned. Other means of restricting relative rotation are also envisaged including, for example, a mating slot and key arrangement whereby one of the two carriers has at the interface surface a slot for accepting therein a protrusion from the interface surface of the other of the two carriers whereby the two mating features restrict relative rotation between the two carriers.

Figure 9:
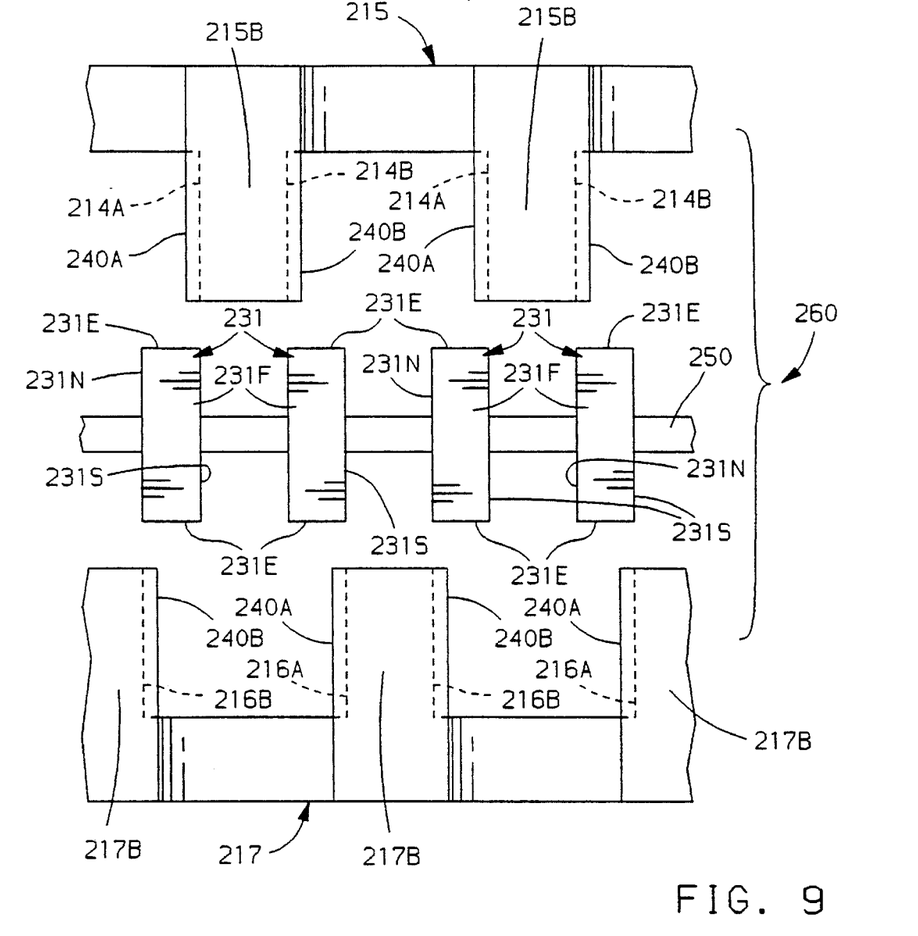
FIG. 9 illustrates a disassembled view of claw-pole members and magnet assembly in accordance with a second claw-pole member geometry with the curvature of illustrated features omitted for clarity.
Figure 10:
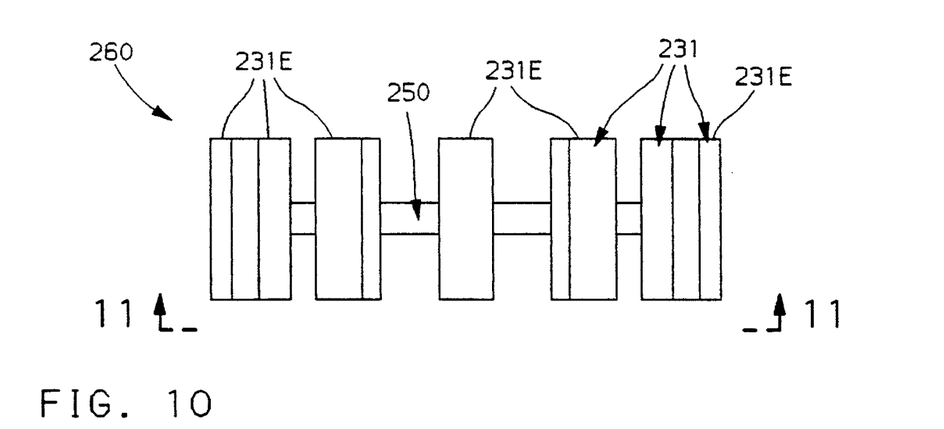
FIGS. 10–11 show various views of a permanent magnet assembly suitable for use with the second claw-pole geometry illustrated in FIG. 9.
Figure 11:
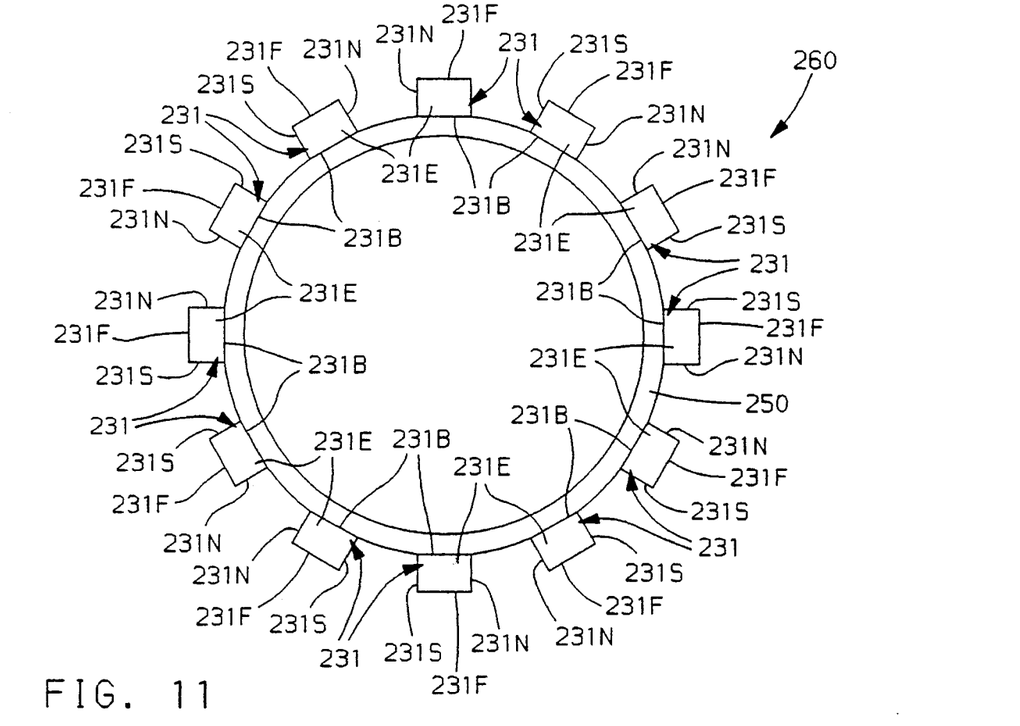

Referring now to FIGS. 9–11, alternative geometries for rotor claw-pole members and corresponding alternative geometries for magnet assemblies are illustrated. The claw-pole geometry is characterized by side surfaces and support ledges running substantially axially to thereby define axial permanent magnet channels. FIG. 9 provides a disassembled view of two claw-pole members and permanent magnet assembly wherein the curvature of those features is omitted for clarity and the illustration therefore represents those features as appearing as if the structures were straightened out across the page. It is apparent that the basic relationship between claw-pole members 215,217 is identical to that of a rotor assembly having claw-pole members with V-shaped pole fingers. That is to say the pole fingers 215B,217B interleave and pairs of opposing adjacent side surfaces 214A,216B and 214B,216A and corresponding pairs of support ledges 240A,241B and 240B,241A define the permanent magnet positions. The combination of the opposing side surfaces and corresponding support ledges provides a channel for the permanent magnets having radial and circumferential boundaries for containment of the magnets 231. Each channel, however, is seen to be axially aligned.

With channels oriented as described, orientation of the permanent magnets will be similar. Therefore, permanent magnet assembly 260 is comprised of a plurality of permanent magnets 231 coupled to a substantially ring-shaped carrier 250 at the outer periphery thereof. The permanent magnet assembly 260 is assembled about the field coil assembly in a fashion previously described. Permanent magnets 231 are coupled to carrier 250 by appropriate fastening means and in an orientation complementary with respect to the permanent magnet channels so as to nest therein. Therefore, each magnet is aligned radially and circumferentially spaced.

Such an orientation of permanent magnets lends the permanent magnet assembly to alternative manufacturing techniques. For example, similar to the skewed magnet assemblies previously described, channeled permanent magnets may be employed in an overmold process to integrate the magnets and carrier. An advantage to the axial alignment of the magnets in the present embodiment is that a unitary permanent magnet assembly may be overmolded. The problems associated with the oppositely skewed magnets of prior examples with respect to mold release are not encountered with the alignment geometry of the present embodiment. Therefore, a two carrier magnet assembly is not desirable nor necessary with this alternate geometry. While figures are not provided for an overmolded magnet assembly having axially aligned permanent magnets, the figures so illustrating such overmolded structures with skewed magnets provide ample illustration readily adaptable by one having ordinary skill in the art.

In any of the previously described embodiments, it is preferable to secure magnetically isotropic, unmagnetized but magnetizable, components to the carrier and thereafter applying a magnetic field thereto to establish the desired magnetic properties including pole orientation. An advantage of the latter technique is that intended pole faces of each yet unmagnetized component are positionally interchangeable and not subject to pole face alignment error prior to securing to the carrier. An additional advantage in forestailing the magnetization is the reduced opportunity for magnet surface contamination due to attracted steel scrap from intermediate machining processes or contaminated work areas. Also, magnetization after the overmold processing reduces difficulties associated with setting up steel dies with magnetized insert stock including orientation problems and magnet damage due to the strong attractive forces. However, an alternative is to utilize permanent magnets which, prior to securing to the carrier(s), have the desired magnetic properties, including pole orientation as described thereby reducing handling and processing after manufacture.

Of additional import when considering the axial magnet geometry, or for that matter the geometry of any one of two oppositely skewed magnet/carrier assemblies as described, is the simplification of molding the entire magnet assembly including the carrier and permanent magnets into a unitary structure in a single process. Such a structure illustrating the axial geometry is illustrated in FIGS. 9–11 although it is to be understood that the general geometries with respect to magnet skewing as illustrated in grouped FIGS. 5,6 and 7,8 likewise may be formed as a unitary structure. Such structures may be formed, for example, by compressing particles of rare earth-iron alloys into unmagnetized assemblies which are thereafter magnetized by exposing at least the magnet portions to a magnetic field of suitable direction and field strength to establish the desired magnetic properties including pole orientation. It is likely unavoidable that a portion of the carrier will become magnetized but is not likely to have significant negative impact upon overall machine performance. In fact, such ancillary magnetization of the carrier may improve the performance of the machine.

While the invention has been described in terms of certain preferred embodiment, it is anticipated that various modifications and alternative embodiments will be apparent to those skilled in the art and thus the scope of the invention is intended to encompass such modifications and alternative embodiments in accord with the claims as follows.

The embodiments of the invention in which an exclusive property or privilege is claimed are defined as follows:

1. A rotor assembly for a hybrid alternator comprising:

a shaft;

first and second claw-pole segments formed of magnetic material carried by said shaft, said first claw-pole segment having a plurality of first circumferentially spaced and axially extending pole fingers, said second claw-pole segment having a plurality of second circumferentially spaced and axially extending pole fingers, said pole fingers being generally V-shaped having first and second side surfaces, each of said side surfaces having a respective permanent magnet support ledge extending substantially normally therefrom, said first and second claw-pole segments being so oriented on said shaft that the pole fingers of said first and second claw-pole segments are interleaved in spaced relationship defining first and second pluralities of permanent magnet channels between opposing side surfaces radially inward of said permanent magnet support ledges, each of said first plurality of permanent magnet channels skewed in a first diagonal direction and each of said second plurality of permanent magnet channels respectively interposed adjacent ones of the first plurality of permanent magnet channels and skewed in a second diagonal direction opposite the first diagonal direction;

a rotor core formed of magnetic material carried by said shaft interposed between said claw-pole segments having opposite ends respectively engaging said claw-pole segments;

a field coil disposed about said rotor core; and, a permanent magnet assembly comprising a first substantially ring-shaped member supporting a first plurality of permanent magnets about an outer periphery thereof being complementarily oriented with said first plurality of permanent magnet channels and a second substantially ring-shaped member axially adjacent said first member and supporting a second plurality of permanent magnets about an outer periphery thereof being complementarily oriented with said second plurality of permanent magnet channels, whereby said permanent magnets are bounded by opposing side surfaces and support ledges of said first and second pole fingers.

2. A rotor assembly for a hybrid alternator as claimed in claim 1 wherein each of said first and second substantially ring-shaped members and respective first and second pluralities of permanent magnets are compression molded as respective unitary structures from a rare earth-iron alloy.

3. A rotor assembly for a hybrid alternator as claimed in claim 1 wherein said first and second substantially ring-shaped members further comprise means effective to substantially restrict relative rotation therebetween.

4. A rotor assembly for a hybrid alternator as claimed in claim 1 wherein said first substantially ring-shaped member comprises a plurality of first flat surfaces around the outer periphery thereof respectively interposed adjacent ones of said plurality of first permanent magnets, said second substantially ring-shaped member comprises a plurality of second flat surfaces around the outer periphery thereof respectively interposed adjacent ones of said plurality of second permanent magnets, said first and second members being complementarily assembled such that each one of said plurality of first flat surfaces is radially behind respective ones of said plurality of second permanent magnets, and each one of said plurality of second flat surfaces is radially behind respective ones of said plurality of first permanent magnets, whereby relative rotation between said first and second substantially ring-shaped members is substantially restricted by interference between respective ones of each flat and permanent magnet.

5. A rotor assembly for a hybrid alternator as claimed in claim 1 wherein said plurality of permanent magnets are insert molded with said carrier ring.

* * * * *